April 3, 1951 R. P. KISSICK 2,547,872
WELDING TORCH
Filed Jan. 31, 1948 3 Sheets-Sheet 1
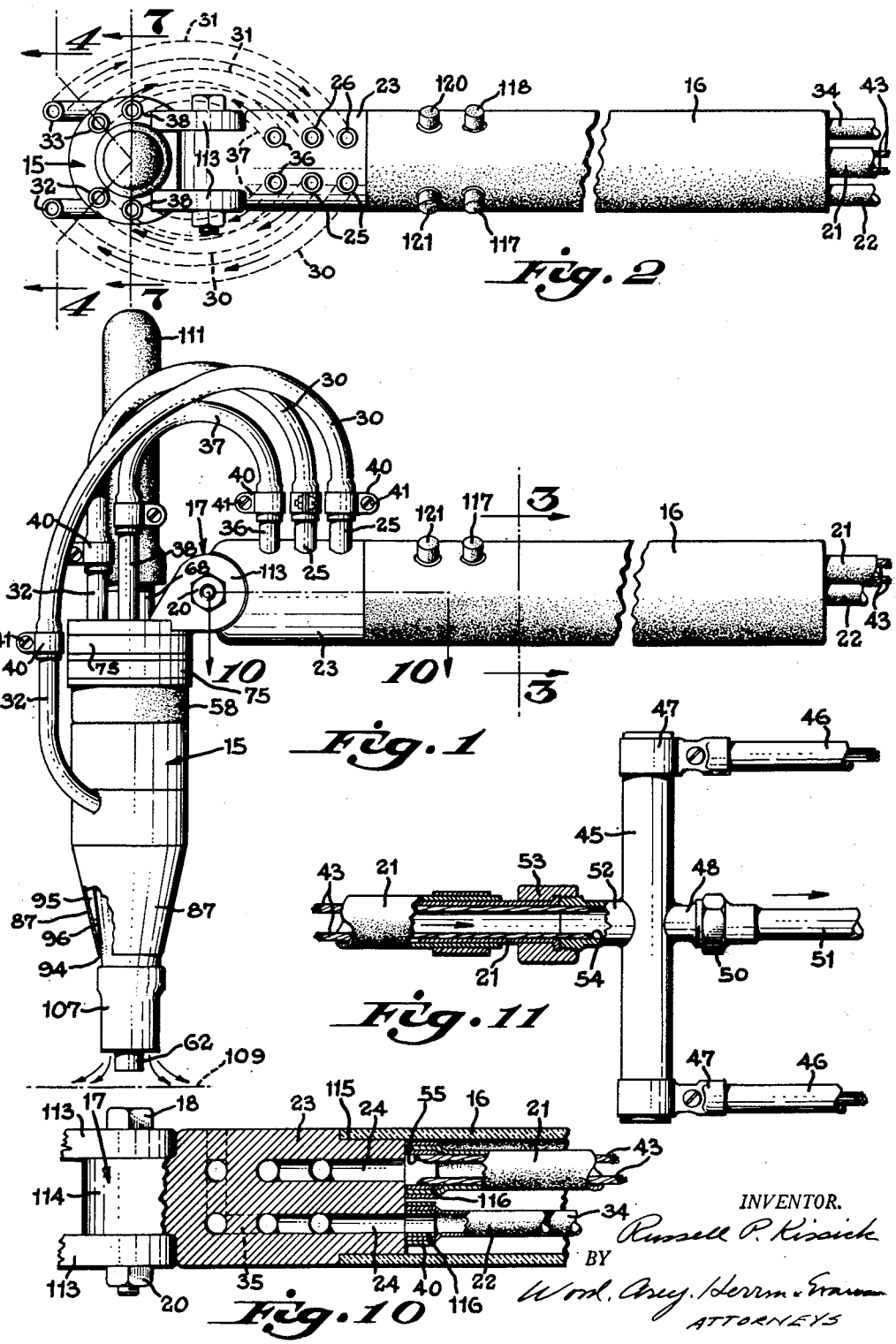
INVENTOR.
Russell P. Kissick
BY
Wm. Carey Herron Evans
ATTORNEYS April 3, 1951 R. P. KISSICK 2,547,872
WELDING TORCH Filed Jan. 31, 1948 3 Sheets-Sheet 2

INVENTOR.
Russell P. Kissick
BY
Wood, Arey, Herron & Evans
ATTORNEYS

April 3, 1951  R. P. KISSICK  2,547,872
WELDING TORCH
Filed Jan. 31, 1948  3 Sheets-Sheet 3

INVENTOR.
Russell P. Kissick
BY
Worl, Amy, Herrm. Evans
ATTORNEYS

Patented Apr. 3, 1951

2,547,872

UNITED STATES PATENT OFFICE 2,547,872

WELDING TORCH

Russell P. Kissick, Cincinnati, Ohio, assignor to Stacey Brothers Gas Construction Company, Cincinnati, Ohio, a corporation of Ohio Application January 31, 1948, Serial No. 5,566

11 Claims. (Cl. 219—14)

This invention relates to gas-shielded arc welding torches of the type employing a non-consumable electrode surrounded by a stream of inert gas such as argon or helium. The gas envelops the tip of the electrode and weld puddle to prevent the formation of oxide inclusions in the weld and to protect from oxidation, the tip of the electrode. More specifically, the present invention is directed to an improved torch of this nature, preferably for hand operation, which embodies structural improvements resulting in increased efficiency, welding capacity and maneuverability.

In gas-shielded arc welding, an arc is established between the work surface and the tip of the electrode and usually a separate filler rod is used to supply the welding material. In the use of filler rods, the end of the rod is presented to the arc to be fused and deposited upon the work. By reason of the argon gas envelope, an uncoated filler rod may be used instead of the coated rod usually associated with electric welding. Also in some instances, by special design, the abutting edges of the work pieces to be joined may be flanged to provide the filler material, using the gas envelope to prevent oxidation.

Among the advantages of gas-shielded arc welding is the high concentration of heat in the weld area and the practical application of uncoated welding rods, which are considerably cheaper than coated rods. Furthermore, this type of welding is highly satisfactory for welding metals and alloys which are difficult to weld, such as aluminum, stainless steel and other alloys. In addition to the value of the present invention in welding heavy materials it has been found that thin materials which ordinarily are difficult to weld because of distortion and melting, can successfully be welded by this procedure.

The present improvements reside particularly in a swivel mounting between the handle and body of the torch, an improved liquid circulation system for cooling the electrode and torch and an arrangement by means of which the torch nozzle and electrode are protected against oxidation by the inert gas atmosphere which provides supplemental cooling for the nozzle and the tungsten electrode. In addition to these improvements in the design of the welding torch, the cooling liquid circulated through the torch is used also to cool the cable which conducts the welding current from the source of supply to the torch. This is accomplished by running the cable or cables through one or both of the liquid supply lines. In view of the fact that the welding current sometimes reaches 800 amperes, these cables normally must be of substantial thickness in order to function properly without overheating. By the use of liquid cooling however, cable thickness may be greatly reduced thereby permitting greater flexibility, ease of manipulation by the operator and a considerable weight reduction.

It is an object of the invention to provide an inert gas-shielded welding torch having a gas and water circulation system which includes a hinge connection between the handle and torch body to permit the angle between the torch and handle to be adjusted to facilitate access into restricted quarters. In order to provide adjustability, the lines for supplying gas and coolant to the torch are in the form of flexible loops between the handle and torch body to permit relative movement between the two parts when adjustment is required.

Another object is to provide readily accessible means for positioning and adjusting the electrode rod relative to the torch body by the use of a relatively long electrode rod which extends through and projects above the torch to form an adjustment extension which is enclosed and protected by a conveniently removable closure thimble.

A further object is to provide a combined gas and liquid coolant system whereby the inert gas serves both as a coolant and as a non-oxidizing agent and cooling efficiency is increased, resulting in compactness and weight reduction in the torch structure.

Another object is to protect the torch nozzle and the tip of the electrode from oxidation by an inert gas which serves the additional purpose of cooling that portion of the outlet nozzle which is presented to the work and exposed to the high temperature developed by the arc.

Still another object is to provide greater cooling efficiency by means of dual cooling systems, one to the interior and one to the exterior of the torch at its lower end. The interior cooling system provides a constant flow of coolant downwardly for substantially the full length of the electrode in close proximity thereto, while the outer system serves to cool the outside of the torch body at its lower end which is exposed to the high temperatures developed in the welding operation. The improved efficiency thus provided permits the use of maximum welding currents through a torch or holder of minimum size and weight.

Still another object of the invention is to simplify the structure of the torch and to reduce to a minimum the number of necessary parts to facilitate assembly and reduce fabrication costs.

Further objects and advantages will be more fully set forth in the specification with reference to the drawings in which:

Figure 1 is a side elevation illustrating the general arrangement of the torch assembly including the handle and flexible connecting tubes between the torch body and handle.

Figure 2 is a top plan view projected from Figure 1 further illustrating the general assembly, the connecting tubes being shown in broken lines to more clearly disclose the structure.

Figure 10 is a sectional view taken on line 10—10, Figure 1, detailing the gas and coolant manifold block for the handle.

Figure 11 is a fragmentary sectional view illustrating the fittings for the coolant lines and electrical cables at the supply end.

Figure 9:
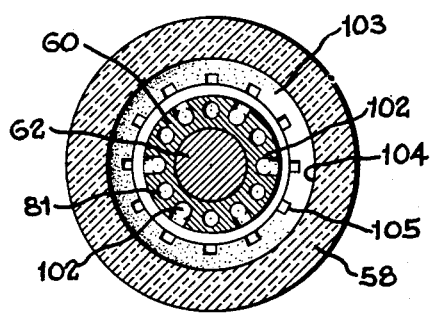
Figure 9 is a sectional view taken on line 9—9 of Figure 7, further illustrating the gas distribution passageways through the body of the torch.

Referring to Figure 1, the torch body is indicated generally at 15, having a handle 16 hingedly connected at its upper end by means of the pivotal joint 17. The joint includes a hinge bolt 18 having a nut 20 which may be loosened to permit the torch body to be adjusted angularly relative to the handle according to the particular job requirements.

In the present instance the torch is cooled primarily by a liquid coolant such as water to which may be added an anti-freeze solution so that the danger of freezing during periods of non-use is eliminated. The liquid is circulated through the torch body, being supplied to the handle by means of a pair of flexible tubes 21 and 22 which extend from a source of liquid supply, passing through the handle and into the torch body. If anti-freeze is utilized the coolant preferably is handled by a circulating pump system arranged for cooling and recirculating the stream of liquid. Some of the commercially available welding machines or welding transformers are equipped with a coolant system and when the torch is used in conjunction with these, such coolant systems may be used to circulate coolant to the torch or torches.

Figure 3:
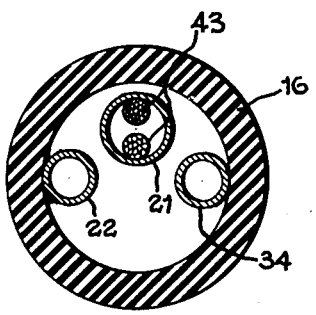
Figure 3 is a sectional view taken on line 3—3, Figure 1, further detailing the torch handle structure.

As shown in Figures 2 and 3, the coolant is supplied through the tube 22 and is returned for discharge or circulation through the tube 21. The handle 16 is tubular and the tubes 21 and 22 pass through the handle and are connected to a manifold block 23 secured to the forward end of the handle. The manifold block 23 which may follow any preferred design includes internal passageways 24—24 (Figure 10), leading from the tubes 21 and 22 to establish a connection with the pairs of nipples 25—25 and 26—26. These nipples are arranged on opposite sides and extend upwardly from the manifold block, the nipples 25 serving to supply coolant and the nipples 26 serving to return the coolant. In the present disclosure the torch body 15 is provided with dual cooling jackets, one inside of the torch body and the other at its lower end on the outside. For this reason two independent coolant circuits are provided.

In order to permit angular adjustment between the torch and handle, flexible connector tubes are provided between the manifold block and the torch body as shown in Figure 1. To facilitate illustration these tubes are shown in broken lines in Figure 2. As shown, one pair of tubes 30—30 is connected to the supply nipples 25—25 and the other pair of tubes 31—31 is connected to the coolant return nipples 26—26. These tubes are in the form of flexible loops and their respective opposite ends are connected to nipples secured to the torch body opening into the respective cooling systems previously noted. Thus the ends of the coolant supply tubes 30—30 are connected respectively to the supply nipples 32—32 supplying the coolant respectively to the inner and outer cooling systems. The ends of the return tubes 31 are connected respectively to the torch body return nipples 33—33. An independent coolant flow thus is established from the supply nipple 32, through the torch body to the return nipple 33 at the upper end of the torch body and a similar flow is provided for the jacket at the lower portion of the body. These respective systems are hereinafter disclosed in detail.

A third supply tube 34, similar to the tubes 21 and 22, extends through the handle 16 (Figure 3). This tube conducts a supply of inert gas such as argon and its inner end is connected to the manifold block 23, which includes a passageway 35 from tube 34 to the respective gas supply nipples 36—36 at the forward end of the manifold block. These nipples, similar to the coolant nipples, are connected by loops of flexible tubing 37—37 to a pair of gas intake nipples 38—38 extending upwardly on diametrically opposite sides, from the top of the torch body. Unlike the coolant systems, the gas is not circulated in the torch body but is distributed uniformly in a series of streams which pass downwardly to be discharged from the nozzle at the lower end of the torch. The gas thus forms a blanket or envelope surrounding the electrode and weld puddle. The details of the gas passageways are more clearly disclosed hereinafter with reference to the detailed description of the torch body.

The flexible supply and connector tubes preferably are formed of rubber, synthetic rubber or a suitable plastic material of appropriate pliability.

The opposite ends of these tubes are slipped upon the respective nipples of the manifold and torch body and they may be clamped in position permanently by means of connector clips 40 formed of sheet metal and having their ends secured together by means of screws 41 as shown in Figure 1.

It is to be noted that the welding current is supplied to the torch by means of the stranded cable indicated at 43, Figures 1, 2 and 3. In the present instance cable 43 is paired, although if desired, a single cable of required size may be employed. Since the power consumed during the welding process is of high amperage, normally it would be necessary to provide a relatively heavy cable in order to avoid overheating. Such cables are awkward to handle and make it more difficult for the operator to manipulate his torch, especially when working on small or intricate work pieces. It has been found that if the power lines are cooled, a cable of considerably lighter construction may be utilized. To achieve this result the power cables 43 are run through the water return tube 21 whereby the coolant flowing in the tube cools the cable and serves also as an insulating covering for the cables.

Referring to Figure 11, illustrating a preferred connector for the cable at its source of current supply, a T-shaped fitting 45 is provided which serves to conduct the coolant from tube 21 to its point of discharge and to conduct the welding current from the source of current supply to the pair of cables 43. As shown, current is conducted to the fitting 45 by a pair of supply cables 46—46 having their ends connected to the welding current generator or transformer, as the case may be. The cables are connected to the opposite ends of the fitting 45 by means of electrical connectors or clamps 47—47 which may follow any conventional design. Centrally of the fitting is formed a nipple 48 having its end threaded to receive the coupling union 50, which connects nipple 48 to a coolant line 51. Upon the opposite side of fitting 45 is a second nipple 52, somewhat larger than nipple 48. Nipple 52 likewise is threaded to receive a coupling union 53 which establishes a connection between nipple 52 and the flexible liquid return tube 21.

As illustrated, the ends of the cables 43 are connected electrically to the inside diameter of nipple 52 by means of a brazed or soldered joint indicated at 54. Welding current therefore, passes from supply cables 46—46, through fitting 45, nipple 52, to the paired cables 43. Cables 43 follow the coolant tube into the handle 16 and their ends are electrically connected to the manifold block 23 by a brazed or soldered joint, indicated at 55 (Figure 10). The current supply then passes from block 23 through hinge 17 to the body of the torch and to the electrode. The welding circuit is completed in the usual manner by connecting the opposite side of the circuit to the work so that an arc can be established between the end of the electrode and the work.

The return coolant passes from tube 21 to the discharge line 51 through the connector either to be discharged or recirculated according to the design of the supply system. It is to be noted that the connector arrangement illustrated is representative of one of several possible designs and that other arrangements may be provided if desired.

Specifically described with reference to Figures 4 and 7, the torch body is made up generally of an inner core indicated generally at 56 and an outer shell indicated generally at 57. These two units are joined together by a heat and electrical insulating bushing 58 formed of suitable heat resistant composition such as one of the thermo setting plastics. The core preferably is machined as a unit from heat resisting copper for rapid dissipation of heat and constitutes a manifold head 60 having a downwardly extending electrode holder tube or chuck 61.

The electrode 62, which preferably takes the form of a tungsten rod, extends through this tube and is clamped frictionally by means of respective upper and lower collets or split bushings 63 and 64. Lower bushing 64 is screwthreaded directly into the lower end of tube 61, the tube having a tapered pipe thread 65 to receive the bushing. The bushing is split at several points indicated at 66 so that it may contract in diameter when it is screwed into the tapered screwthreaded bore 65 to clamp the electrode. The collet bushing 64 further includes a cross slot 67 to permit engagement by a suitable instrumentality for loosening the bushing when it is desired to adjust the electrode. It will be apparent, therefore, that the electrode rod is clamped firmly in position and in electrical contact with the chuck 61.

The upper collet 63 follows substantially the same construction as the lower, being engaged in a threaded boss 68 which is preferably welded to manifold head 60.

Forming a part of manifold head 60 is provided a hub 70 having a diameter somewhat larger than the outside diameter of chuck tube 61. To the lower end of hub 70 is welded the upper end of an outer tube 71 which extends downwardly and is welded to the enlarged end hub 72 of the chuck tube 61. The outer tube 71 thus forms a liquid jacket 73 surrounding tube 61.

Figure 5:
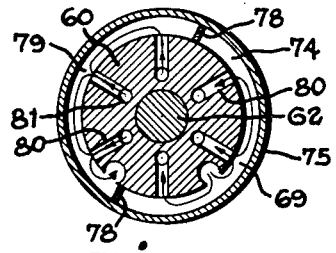
Figure 5 is a cross sectional view taken on line 5—5, Figure 4 illustrating the passageways for the upper coolant manifold.
Figure 8:
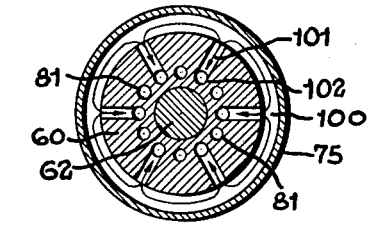
Figure 8 is a sectional view taken on line 8—8 of Figure 7, detailing the gas manifold at the upper end of the torch for distributing the gas about the circumference of the electrode.
Figure 4:
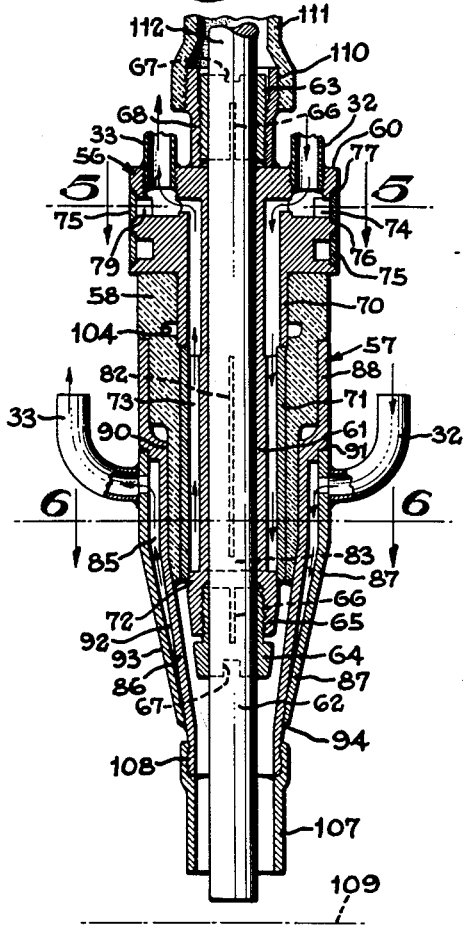
Figure 4 is a vertical sectional view taken on line 4—4 Figure 2, illustrating the liquid coolant circulating system, the plane of the section being distorted slightly to show the complete system in a common plane to more clearly illustrate the same.

Referring to Figure 4, the liquid coolant is circulated through this jacket in the following manner. Entering the intake nipple 32 as indicated by the arrows, the coolant enters an annular groove 74 machined in the manifold head 60. A closure ring 75 seated in a groove 76 is applied on the outside diameter of head 60 and is brazed or welded thereto as at 77 to close the groove. Referring to Figure 5 it will be noted that a pair of baffles 78—78 is inserted at diametrically opposite sides of groove 74 thus splitting the groove into two semi-circular portions, 69 and 79. A series of radial holes 80, in the present instance six in number, is drilled in the head 60, preferably at equidistant points around its circumference as illustrated in Figure 5. The holes 80 connect the annular groove with respective longitudinal bores 81 extending downwardly through hub 70. Three of these radial holes 80 open into the intake side 69 and three into the outlet side of the groove 79. Thus the coolant flows from groove 74, down the vertical bores 81 into the lower coolant jacket 73. The relationship of the longitudinal bores 81 with respect to the electrode rod is more clearly disclosed in Figure 9.

A pair of diametrically opposed baffles 82—82 is mounted within the jacket 73. The lower ends of these baffles terminate somewhat above the enlarged lower boss 72 as indicated at 83 (Figure 4). Coolant thus is caused to flow downwardly for substantially the full length between chuck tube 61, and outer tube 71, passing across the lower edges of baffles 82 and returning upwardly in the opposite side of the jacket. Upon reaching the upper end of jacket 73 the coolant flows into the vertical bores 81, through manifold head 60, through radial holes 80 into the left hand groove portion 79. As indicated by the arrows in Figures 4 and 5, from the outlet portion 79 of groove 74, the coolant enters the coolant return nipple 33 and is conducted from the head. This arrangement provides a graduated cooling action, the longitudinal bores 81 serving to carry away heat from the upper portion of the body and core and the jacket 73 providing a more direct cooling action to carry away the more intense heat prevalent in the lower portion of the chuck tube 61, due to its proximity to the welding zone.

A secondary exterior cooling jacket 85 is provided for the lower portion of the torch. This jacket is in the form of spaced inner and outer shells 86 and 87. The upper end of the inner jacket 86 includes an enlarged diameter or counter bore 88 which is press fitted upon a counterturned portion 90 of the insulating bushing 58. The upper end of outer shell 87 is joined preferably by welding as at 91 to the lower edge of the enlarged diameter 88. The respective inner and outer shells include tapered portions 92 and 93 respectively, the lower end of the outer shell being welded or brazed to the inner shell as at 94 to seal off the coolant jacket.

Figure 6:
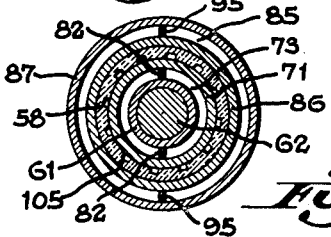
Figure 6 is a sectional view taken on line 6—6, Figure 4 illustrating the inner and outer coolant jackets.

As shown in Figure 6, a pair of diametrically opposed baffles 95—95 is located inside coolant jacket 85 more uniformly to control the flow of coolant. The respective lower intake and outlet nipples 32 and 33 communicate with the coolant jacket 85 on opposite sides thereof. As shown in Figures 1 and 4 the coolant enters through the intake nipple 32 into the jacket and passes across the lower ends of baffles 95 which terminate as at 96 above the closed lower end of the jacket. Therefore, the righthand side of the jacket provides an inlet passageway and the left hand side provides an outlet passageway to the outlet nipple 33 to return the coolant to the circulating system.

It will be observed at this point that the inner and outer cooling systems are independent of each other. However, if desired, the two systems may be connected in series in order to eliminate one of the flexible tube connections between the torch and handle. If this is desired, a connection may be established between the upper outlet nipple 33 directly to the lower intake nipple 32 to cause the fluid to flow first through the interior cooling system then to pass from outlet nipple 33 at the top for recirculation through the lower coolant jacket 85, thence to be returned to the system from the lower outlet nipple 33.

It is to be noted from the foregoing that the manifold head 60 and core 56, including the jacket 73 at its lower end, is electrically and heat insulated from the exterior jacket structure 85 by the insulated bushing 58. In operation, the tungsten electrode reaches high temperatures, which in the absence of cooling means, would render the torch impractical. By provision of the interior and exterior cooling jackets, the heat is carried away at a sufficient rate to prevent overheating of the torch. Furthermore by virtue of its efficient cooling system, the torch may be made quite small and compact, and yet be capable of carrying maximum welding loads.

Figure 7:
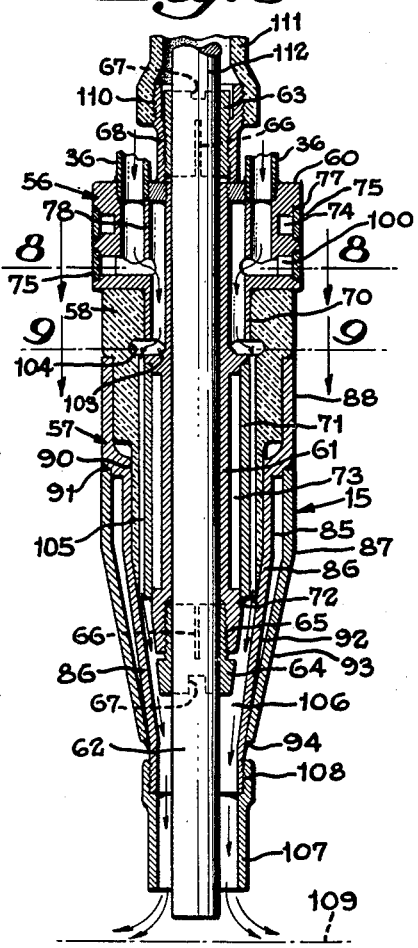
Figure 7 is a general vertical sectional view taken on line 7—7, Figure 2, similar to Figure 4, the section in this instance being taken in the plane of the gas distributing passageways of the torch.

As illustrated in Figure 7, the core 56 and manifold head 60 are provided also with passageways to distribute the flow of argon gas supplied to the torch. For simplicity of illustration, the gas passageways only, are illustrated in Figure 7. As illustrated, the head 60 includes a second annular groove 100, disposed immediately beneath groove 74 and of identical construction. Groove 100 includes a closure ring 75, similar to that of groove 74. A series of equidistant radial holes 101 is drilled through the head 60 and communicates with longitudinal bores 102 through hub 72. This arrangement is identical to the coolant distribution system disclosed with reference to Figure 5, the longitudinal gas passageways 102 being located on the same radius and between the coolant passageways 81. In the present embodiment, therefore, there is provided a series of twelve vertical bores 81 and 102 surrounding the electrode rod 62, providing alternate liquid coolant and gas passageways.

Upon reaching the lower edge of hub 70, the gas flows, laterally through the passageways 103 into an annular groove 104 formed in the inside diameter of the insulator bushing 58, as indicated by the arrows in Figure 7. This passageway arrangement is shown in greater detail in Figure 9. As shown, the inside diameter of bushing 58, beneath groove 104, is provided with a series of slots 105, the upper ends of which open into the annular groove 104. These slots extend downwardly through the bushing and are open to the outside diameter of the outer tube 71, which surrounds the lower portion of the chuck tube 61. The lower ends of slots 105 are open, the gas therefore takes the form of a series of streams flowing between bushing 58 and the outside of the inner water jacket 73 to provide a secondary cooling medium. Upon leaving the lower end of slots 105, the gas flows down the annular space 106 between the lower exposed end of the electrode rod 62 and the inside diameter of inner shell 86 to cool and shield the lower portion of the electrode and shell 86.

A nozzle 107 is screwthreaded as at 108 upon the lower end of inner shell 86 so that the gas is discharged in the form of a tubular blanket surrounding the operating tip of electrode rod 62 and spreading radially in the form of a blanket over the work surface 109 as indicated by the arrows in Figure 7. The inert gas blanket thus forms an envelope excluding air from the welding zone and electrode to prevent oxidation. In the welding operation a filler rod usually is used to provide the welding material, since the electrode 62 is substantially non-consumable and serves only to establish the arc relative the work surface. By virtue of the gas blanket the filler rod need not be coated since the gas blanket effectually prevents oxidation.

It has been found that the cooling effect provided by the flow of gas between the nozzle 107 and electrode 62, effectively prevents overheating of the torch at its lower end. The gas envelope also protects the nozzle and electrode from deterioration due to welding heat and excluding air, prevents oxidation. The gas flow arrangement therefore permits the use of a small diameter electrode and gas shield nozzle 107 to provide a torch for delicate welding operations where it is necessary to restrict the welding operation to a small area.

As previously noted the insulating bushing 58 provides an insulator between the core 56 and outer shell 85. The welding current is conducted from manifold block 23 to the head 60, through the head to the electrode rod, the lower portion of the torch being electrically insulated from the core by the bushing. This prevents the formation of an arc between the lower end of the nozzle 107 and the work which otherwise might occur if the lower portion of the torch were in electrical connection with the welding current. It has been found, by virtue of the cooling effect of the coolant and gas and the effect of the gas in preventing oxidation, that the torch may be operated for long periods of time with substantially no burning or oxidation of the electrode and nozzle.

As shown in Figure 1, the upwardly extending boss 68 of manifold head 60, is externally screwthreaded as at 110 and an elongated thimble 111 is screwthreaded upon the boss to enclose the upwardly extended end 112 of electrode rod 62 to protect the rod. The thimble preferably is formed of an insulating material such as a plastic composition. The upper extended portion 112 of the rod provides a hand hold which facilitates longitudinal adjustment of the rod. When the rod requires adjustment relative to the torch body, thimble 111 is removed, the upper and lower collets 63 and 64 are loosened and the rod is shifted to its required adjustment. The collets are then tightened and the thimble 111 replaced.

Upon the upper surface of manifold head 60 is welded or otherwise secured a pair of spaced ears 113—113 which provide the hinge elements for the previously noted hinge 17 between the torch body and handle. These ears are spaced to receive a lug 114 formed as an integral part of the manifold block 23 as shown in Figure 10. The bolt 18 passes through a bore formed through the ears and lug to establish a pivotal connection between the body and handle and the ears are slightly yieldable so that the nut 20 may be tightened to frictionally clamp the lug 114.

As shown in Figure 10 the manifold block 23 includes a counterturned portion 115 at its inner end upon which the handle 16 is press fitted or otherwise secured. The inner end of the counterturned portion is provided with nipples 116 to receive the ends of the respective gas and coolant supply tubes. These may be clamped to the nipples by means of tube clamps 40 similar to those used for the connector tubes between the manifold block and torch body as previously disclosed. For convenience in assembly, the tubes may be connected to the nipples and clamped thereon prior to assembling the handle 16 to the block 23.

As shown in Figures 1 and 2 the handle includes a set of four electrical control buttons for the purpose of remotely controlling the output of the welding apparatus when welding apparatus having a secondary control system is utilized. These buttons are in circuit with a series of secondary control cables (not shown) which extend from the switches to the control circuit of the welding transformer or generator. Since the control system constitutes another invention, the control circuit is not disclosed. Such secondary circuits serve to start and stop the welder and to raise or lower the current supply as required by the working conditions. Also in the operation of gas-shielded torches of the present nature, the arc may be initiated by a supply of high frequency current which also is supplied by the apparatus as required.

For this purpose, switch 117 constitutes a stop button to shut down the welding apparatus, switch 118 controls the generation of high frequency currents, switch 120 serves to raise the current supply and switch 121 lowers the current supply. These switches are conveniently located for finger tip operation and the operator is able to control the current supply as required by the working conditions. This results in improved performance and improved workmanship since the current is controlled directly as dictated by conditions encountered during the progress of the welding operation.

Figures 12, 13:
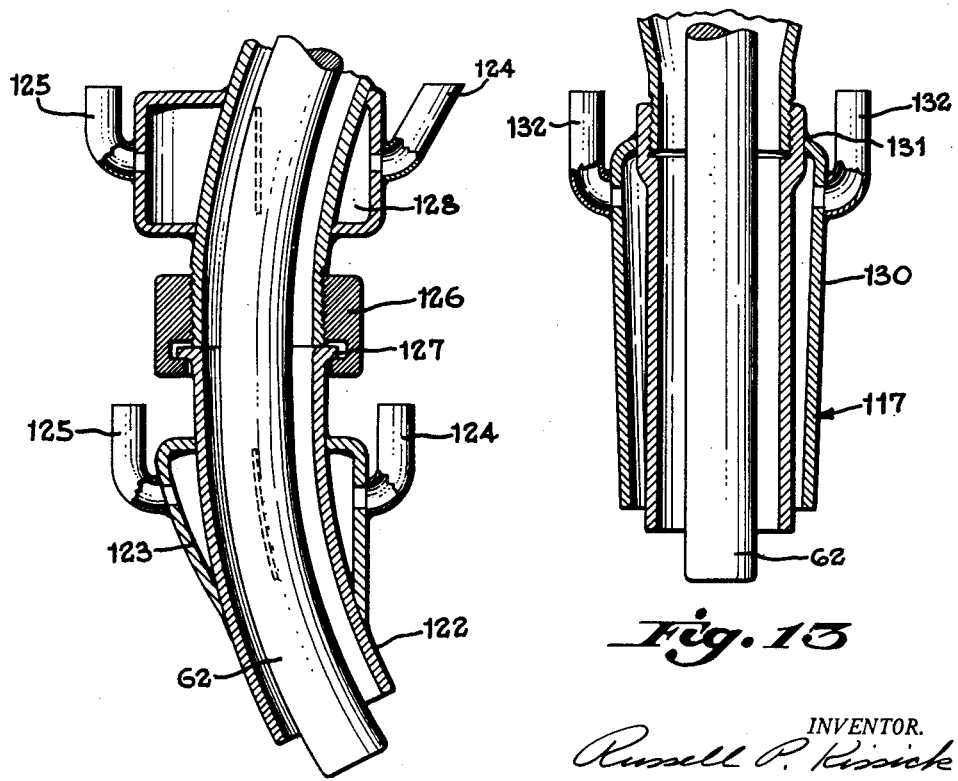
Figure 12 is a fragmentary sectional view showing a modified arrangement in which the lower end of the torch and electrode are curved to permit access into restricted work areas.
Figure 13 is a view similar to Figure 12 illustrating an outside shell for gas cooling the exterior of the torch nozzle.

A somewhat modified torch structure is illustrated in Figure 12 in the form of a detachable nozzle to make the torch more readily applicable to difficult welding operations. As illustrated, the detachable nozzle 122 is of curved form although it may be made in other shapes depending upon the particular job requirements. A supplemental cooling jacket 123 having baffles similar to those previously described with reference to the torch body, is welded or brazed upon the nozzle 122. Coolant intake and outlet nipples 124 and 125 are arranged to be connected by flexible tubing to the coolant supply system. This supplemental cooling system may be applied to a straight nozzle as well as to nozzles having angular or curved shapes. The detachable nozzle is fastened to the lower end of the torch body by means of a coupling nut 126 engaging a flange 127 formed at the upper end of the nozzle.

As disclosed, the lower end of the torch body also is provided with a cooling jacket 128 substantially of the same form as jacket 123 of the detachable nozzle. Cooling jacket 128 may be used instead of jacket 123 when the detachable nozzle is removed from the torch. If the working conditions require additional cooling, both cooling jackets may be interconnected. The arrangement disclosed may be applied with advantage to a straight torch and the detachable bushing 122 may be in the form of an elongated small diameter tube to provide a torch suitable for reaching into restricted quarters.

A further addition to the torch structure which provides supplemental cooling for the gas nozzle 117 is illustrated in Figure 13. The upper torch structure may follow substantially that previously disclosed. However in order to provide additional cooling for the nozzle an outer sleeve 130 is secured preferably by welding as at 131 to the upper end of the nozzle. Gas supply nipples 132—132 open into the opposite sides of the outer tube so that a secondary gas blanket is caused to flow around the outside diameter of the nozzle 117 as well as between the inside diameter of the nozzle and the electrode 62. This structure may be applied to larger torches which are designed for heavy duty. In such torches the flow of gas at the interior of the nozzle may be insufficient to keep the temperature of the nozzle within safe limits with the result that its outside diameter, which is exposed to the atmosphere, becomes oxidized. It has been found that the supplemental cooling jacket provided by the outer shell 130 prevents overheating and oxidation with the result that the nozzle lasts almost indefinitely under extremely adverse welding conditions.

In each of the supplemental arrangements disclosed the operation and construction of the torch body is substantially identical to that previously disclosed. In each instance a protective blanket of gas is caused to flow between the outer tube and electrode to provide a coolant and to protect the parts and weld puddle from oxidation.

Having described my invention, I claim:

1. An electrode holder for use in electric arc welding comprising: an electrode holder, a handle therefor, said holder being pivotally mounted on said handle for angular adjustment with respect thereto, said electrode holder including electrode securing means, an electrode mounted in said means and extending axially the full length of the electrode holder, said electrode projecting above said holder, and a removable insulated cap means mounted on the upper end of the electrode holder for covering the extended upper end of the electrode, said cap providing an insulated hand hold for angular adjustment of said holder.

2. A gas-shielded liquid cooled arc welding torch comprising; a torch body, a handle, pivotal connecting means between said body and handle to permit the torch body to be adjusted angularly relative to said handle, respective flexible coolant and gas conduits extending from said handle to said body and, a welding current supply cable electrically connected to the forward end of said handle, said pivotal connection being arranged to conduct the welding current supply from the handle to said torch body.

3. An electric arc welding torch comprising; a torch body, electrode clamping means in said body, said clamping means being accessible for clamping adjustment from one end of the torch body without disassembly of the body, an electrode rod extending through the said body, said body having an opening at its lower end to present the lower end of said electrode rod to the work surface, said electrode rod having an upper end projecting above the top of the body to provide a hand hold for adjusting the same relative to the body, and a detachable closure member extending upwardly from the torch body to enclose the upwardly projected end of said rod.

4. An electric arc welding torch comprising; a torch body, an electrode mounting tube extending through said body, an electrode rod mounted in said tube, said torch body having an opening at its lower end to present the lower end of said electrode rod to the work surface, said electrode rod having an upper end projecting above the top of the torch body to provide a hand hold for adjusting the same relative to the body, clamping elements on said mounting tube arranged to clamp the electrode rod relative to the tube, said clamping means being accessible for clamping adjustment from one end of the torch body without disassembly of the body and, a detachable closure thimble extending upwardly from the torch body to enclose the upwardly projected end of said rod.

5. A gas-shielded electric arc welding torch comprising; a torch body, a core member within said torch body, said core member having a manifold head and including an electrode mounting tube, an electrode rod mounted in said tube, said manifold head having an annular groove, gas supply means associated with said groove, a plurality of circumferentially spaced longitudinal passageways extending from said groove downwardly through said core member in proximity to said electrode mounting tube to cool the same, said torch body having a shell including a gas discharge nozzle at its lower end and said electrode rod extending downwardly through said nozzle, said longitudinal passageways terminating above said nozzle to provide a gas envelope surrounding the lower end of the electrode rod and work surface.

6. A gas-shielded liquid cooled electric arc welding torch comprising; a torch body, respective inner and outer body members, an electrical insulating bushing between said inner and outer body members, an electrode rod extending through said inner body member, liquid coolant conduits associated with said inner body member, means for supplying coolant to said conduits, cable means in electrical connection with said inner body member arranged to conduct a supply of welding current through said body member to said electrode rod, gas conduits associated with said electrical insulating bushing, means for supplying gas to said conduits, a shell having a gas discharge nozzle, said electrode rod extending through said nozzle and, said gas conduits communicating with said shell to provide a gas envelope between said nozzle and electrode rod.

7. A liquid cooled electric arc welding system comprising; a torch body, a handle, a manifold block mounted in said handle, means on said block for establishing a pivotal connection between said handle and torch body, coolant passageways in said torch body, means for mounting an electrode rod in said torch body, a source of liquid coolant and a source of electric arc welding current for said electrode rod, conduits extending from said source of liquid coolant to said torch body, an electric current supply cable extending through one of said conduits and in electrical connection with said manifold block, a fitting for said conduit at the source of coolant supply, said cable having its end in electrical connection with said fitting and, means for electrically connecting said fitting to said source of arc welding current.

8. A gas-shielded liquid cooled electric arc welding torch comprising; a torch body, respective inner and outer body members, an insulating bushing between said inner and outer body members, an electrode rod extending through said inner body member, liquid coolant conduits associated with said inner body member, means for supplying coolant to said conduits, gas conduits associated with said bushing, means for supplying gas to said conduits, a shell at the lower end of said outer body member, a detachable gas discharge nozzle on said shell, said electrode rod extending through said nozzle, said gas conduits communicating with said shell to provide a gas envelope between said nozzle and electrode rod, a coolant jacket surrounding said shell, and means for circulating coolant through said jacket to cool the shell.

9. A gas-shielded liquid cooled electric arc welding torch comprising; a torch body, a core member within said torch body, said core member having a manifold head and including an electrode mounting tube, said manifold head having a pair of annular grooves, gas supply means associated with one of said grooves, coolant supply means associated with the other of said grooves, a plurality of longitudinal gas and coolant passageways extending from said respective grooves downwardly through said core member, a coolant jacket associated with said electrode mounting tube and in communication with said coolant passageways, a bushing surrounding said electrode mounting tube, said bushing having an internal annular groove and having a plurality of longitudinal slots communicating with said annular groove, said longitudinal gas passageways communicating with said annular groove to discharge gas through said slots, and a gas discharge shell extending from the lower end of said bushing to conduct the gas discharged from said slots to a work surface.

10. A gas-shielded liquid cooled electric arc welding torch comprising; a torch body, a core member within said torch body, said core member having a manifold head and including an electrode mounting tube, an electrode rod mounted in said tube, said manifold head having a pair of annular grooves, gas supply means associated with one of said grooves, coolant supply means associated with the other of said grooves, a plurality of longitudinal gas and coolant passageways extending from said respective grooves downwardly through said core member, a coolant jacket associated with said electrode mounting tube and in communication with said longitudinal coolant passageways, said torch body having a shell including a gas discharge nozzle at its lower end and said electrode rod extending downwardly through said nozzle, and said longitudinal gas passageways terminating above said nozzle to provide a gas envelope surrounding the lower end of the electrode rod and work surface.

11. An electrode holder comprising; an electrode supporting unit, upper and lower concentric cylinders providing coolant jackets and disposed in spaced relationship to each other, said upper cylinder being interiorly disposed adjacent an electrode supported in said unit, said lower cylinder being exteriorly disposed and terminating in a nozzle and means for circulating coolant independently through said cylinders.

RUSSELL P. KISSICK.

REFERENCES CITED

The following references are of record in the file of this patent:

UNITED STATES PATENTS

| Number | Name | Date |
| --- | --- | --- |
| 903,826 | Arsem | Nov. 17, 1908 |
| 985,159 | Goodyear | Feb. 28, 1911 |
| 1,521,361 | Davis | Dec. 30, 1924 |
| 1,618,383 | Lloyd | Feb. 22, 1927 |
| 2,063,467 | Southgate | Dec. 8, 1936 |
| 2,184,335 | Chapman | Dec. 26, 1939 |
| 2,200,887 | Lockwood | May 14, 1940 |
| 2,204,756 | Hasse et al. | June 18, 1940 |
| 2,314,628 | Pavlecka | Mar. 23, 1943 |
| 2,358,158 | Gibbert | Sept. 12, 1944 |
| 2,376,265 | Meredith | May 15, 1945 |
| 2,433,018 | Ronay | Dec. 23, 1947 |
| 2,468,804 | Breymeier | May 3, 1949 |
| 2,468,805 | Herbst | May 3, 1949 |
| 2,468,806 | Pilia | May 3, 1949 |
| 2,468,807 | Herbst | May 3, 1949 |
| 2,468,808 | Drake | May 3, 1949 |

OTHER REFERENCES

Herbst, "Production Applications for Inert Gas-Shielded Arc Welding," "The Welding Journal," May 1949, pages 410–411.